(12) United States Patent
Assassa

(10) Patent No.: US 10,588,464 B2
(45) Date of Patent: Mar. 17, 2020

(54) CUTTING BOARD

(71) Applicant: Ziad Assassa, Munich (DE)

(72) Inventor: Ziad Assassa, Munich (DE)

(*) Notice: Subject to any disclaimer, the term of this patent is extended or adjusted under 35 U.S.C. 154(b) by 103 days.

(21) Appl. No.: 15/789,581

(22) Filed: Oct. 20, 2017

(65) Prior Publication Data
US 2018/0110377 A1 Apr. 26, 2018

(30) Foreign Application Priority Data
Oct. 21, 2016 (DE) .......... 10 2016 120 110

(51) Int. Cl.
B23Q 3/00 (2006.01)
A47J 47/00 (2006.01)

(52) U.S. Cl.
CPC .......... A47J 47/005 (2013.01); A47J 2201/00 (2013.01)

(58) Field of Classification Search
CPC ................. B25B 11/00; A47J 47/005
See application file for complete search history.

(56) References Cited

U.S. PATENT DOCUMENTS

| 6,702,273 | B1* | 3/2004 | Sellers | A47J 47/005 269/285 |
| 8,251,357 | B2* | 8/2012 | Young | A47J 47/005 269/15 |
| 2002/0195763 | A1* | 12/2002 | Benjamin | A47J 47/005 269/289 R |
| 2004/0150151 | A1* | 8/2004 | Diermeier | A47J 47/005 269/289 R |
| 2018/0110377 | A1* | 4/2018 | Assassa | A47J 47/005 |

FOREIGN PATENT DOCUMENTS

DE 102010006687 A1 11/2010

* cited by examiner

Primary Examiner — Lee D Wilson
(74) Attorney, Agent, or Firm — Workman Nydegger

(57) ABSTRACT

The invention relates to cutting board employable on two sides comprising a board body with two mutually opposing main sides and feet for supporting the board body, wherein a first cutting surface is located on one main side of the board body and a second cutting surface on the other main side of the board body. The feet are variably adjustable such that they alternatively support the board body in upwardly direction either with the first cutting surface or with the second cutting surface.

20 Claims, 4 Drawing Sheets

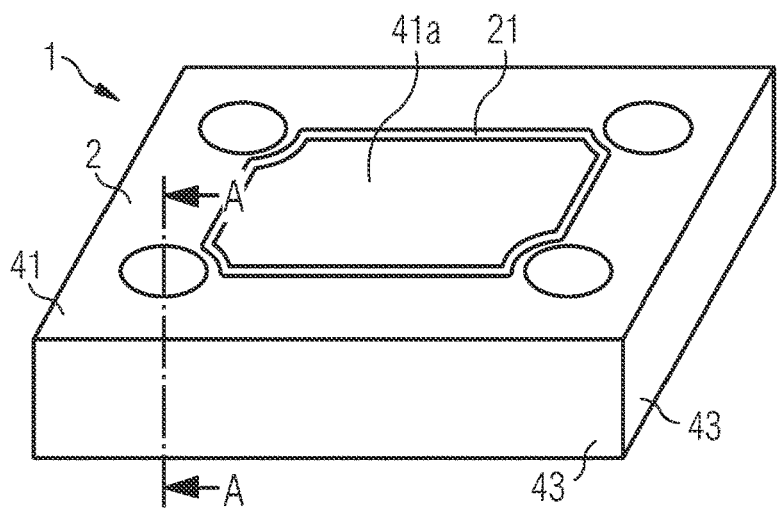
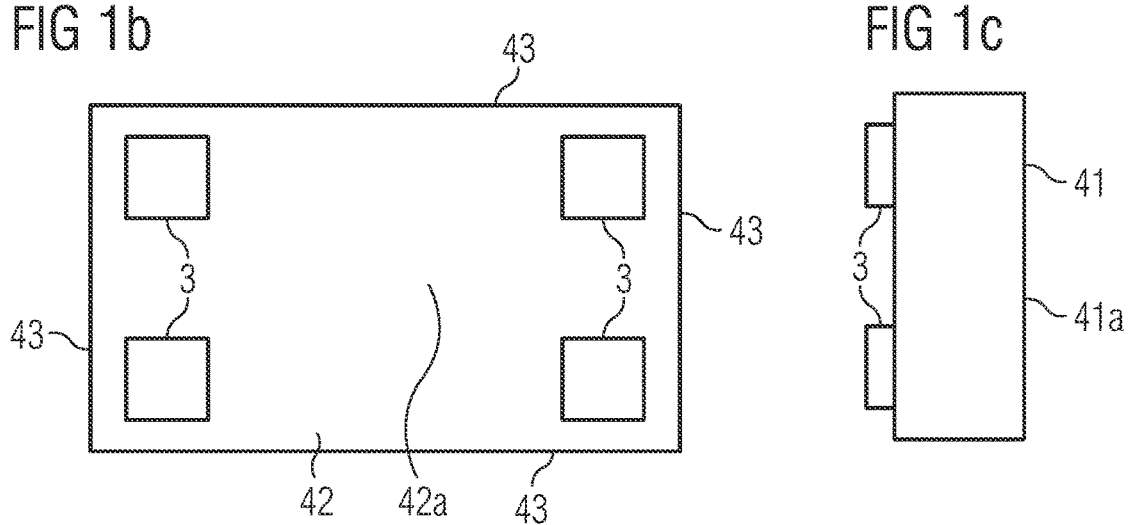
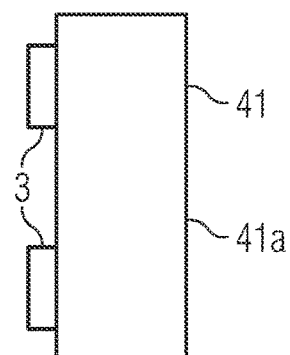
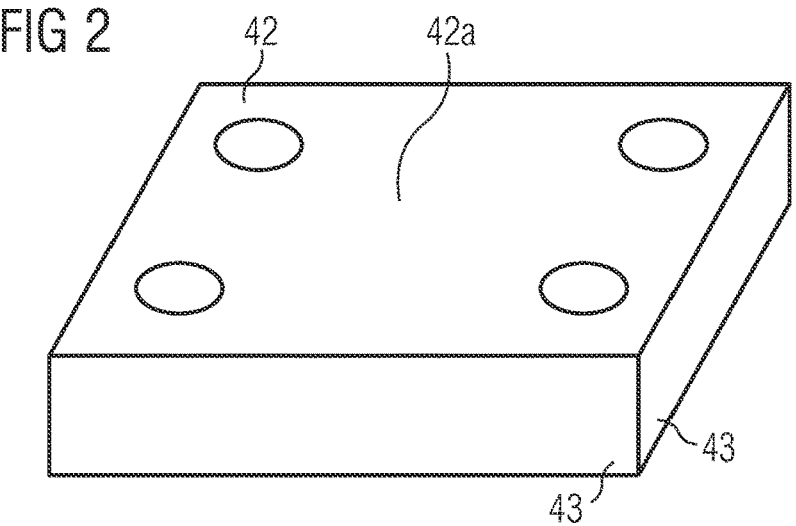

CUTTING BOARD

BACKGROUND

The invention relates to cutting board, employable on two sides, having a board body which has two mutually opposing main sides and feet for supporting the board body, wherein a first cutting surface is located on one main side of the board body and a second cutting surface on the other main side of the board body.

Cutting boards are known apparatuses which are employed to cut foodstuffs. Cutting boards employable on two sides have the advantage that one can cut, e.g. onions on one side and on the other side foodstuffs which should not assume onion taste, such as fruit. From the prior art, cutting boards employable on two sides are known, e.g. from the print DE 10 2010 006 687 A1, which possess two different cutting surfaces which are respectively equipped with fixed anti-slip feet protruding beyond the cutting surface. The anti-slip feet can disturb the cutting operation.

SUMMARY

The object of the present invention is to overcome the disadvantages of the prior art.

The object is solved according to the invention by a cutting board employable on two sides.

The cutting board according to the invention employable on two sides comprises, as mentioned at the outset, a board body with two mutually opposing main sides and feet for supporting the board body. Here, a first cutting surface is located on one main side of the board body and a second cutting surface on the other main side of the board body. According to the invention, the feet are variably adjustable such that they support the board body in upward direction alternatively either with the first cutting surface or with the second cutting surface.

The core of the idea of the invention lies in that the cutting board is reversible by adjusting the feet, to change the cutting surface for cutting foodstuffs. This is performable e.g. to the effect that the feet are not arranged on the board body in a fixed manner but are detachable from the board body and relocatable from one main side of the board body to the other main side. That is to say, the feet can be dismantled or removed from one main side of the board body and then mounted to the other main side of the board body. Then the cutting board is reversed to utilize the other cutting surface for other foodstuffs. Hence no feet protrude beyond the respectively utilized cutting face and the cutting process is therefore not hindered.

In the preferred embodiments of the invention, the cutting board can have at least three, preferably exactly four, feet. The feet can be attached to the board body magnetically, by locking into place, by screwing or in a different manner. The feet are preferably arranged on the edge side, more preferably at the corners of the board body. Moreover, one or several of the feet can have a rubber layer. This rubber layer increases the friction between the feet and a bearing face. Here, the board body can be manufactured of wood and/or bamboo and/or plastic, and the feet consist at least partly of wood and/or metal and/or magnetic material.

According to an embodiment of the invention, the feet are manufactured at least partly from magnetic material and interact with a metal piece attached within the board body, or vice versa the feet are executed partly of metal and a magnetic piece is attached within the board body. By the magnetic interaction, the feet can be simply positioned on the board body of the cutting board and attached thereupon.

In one embodiment of the invention, the board body has recesses which are arranged preferably on the edge side and more preferably on the corners of the main sides of the board body. The recesses are configured preferably respectively as a through hole or blind hole into which respectively one of the feet is insertable. Here, the feet can have respectively a rod portion for inserting into the recess and a broadened head portion for supporting on a bearing face. In a preferred embodiment, the foot is insertable into a through hole from a main side of the board body and terminates with a free end of the rod portion of the foot flush with the other main side of the board body.

In a preferred embodiment of the invention, the rod portion of the foot is equipped with a magnet at its free end, and the through hole respectively with a metal piece, e.g. metal ring, at both its ends. The magnet and the metal piece mutually attract when the rod portion of the foot is inserted in the through hole. Here, the magnet and the metal piece are mutually interchangeable concerning their material.

In an alternative of the invention, the rod portion of the foot has a metal piece and the through hole is equipped with a magnet, e.g. magnetic ring. The magnet is arranged on an inside circumference wall of the through hole in a counter-sunk manner, or vice versa the foot has a magnet and the through hole is equipped with a metal piece, e.g. metal ring. Therefore, the metal piece and the magnet mutually attract when the rod portion of the foot is inserted in the through hole.

In an alternative of the invention, the through hole is equipped with a plastic ring preferably of rubber. The plastic ring is arranged projectingly on an inside circumference wall of the through hole so that the rod portion of the foot is lockable into place at the plastic ring on account of the elasticity of the plastic or anchorable by means of frictional force when the rod portion of the foot is inserted in the through hole.

In an alternative of the invention, the board body of the cutting board has pairwise opposing blind holes on both sides. Here, the rod portion of the foot is equipped with a magnet at its free end and a metal piece is arranged on an intermediate wall between opposing blind holes so that the metal piece and the magnet mutually attract when the rod portion of the foot is inserted in the blind hole. Here, too, the magnet and the metal piece are mutually interchangeable concerning their material.

In a preferred embodiment of the invention, the board body has recesses on both main sides in which respectively a metal piece is fastenable for interacting with one of the feet, which are magnetic. Here, the metal piece has a spherical recess and the foot a spherical projection for inserting into the spherical recess of the metal piece and a head portion for supporting on a bearing face. The projection is preferably smaller in circumference than the head portion so that on the relevant side of the head portion an annular contact face results for placing on the metal piece and/or on the board body of the cutting board.

In a preferred embodiment of the invention, on opposing circumferential sides of the board body respectively at least one magnet, which can interact respectively with one of the feet, is attached within the board body. The foot is metallic and configured in U- or L-shape with at least two legs, of which one leg is set up for placing on one of the opposing circumferential sides of the board body, and the other leg for placing on one of the main sides of the board body to support this main side of the board body. Further alternatively, the foot can be U-shaped (not shown), wherein the foot with its second free leg sits in a recess (not shown) of the circumferential side.

BRIEF DESCRIPTION OF THE DRAWINGS

Further advantages, features and details of the invention will result from the following description, in which embodiment examples of the invention will be described in detail with reference to the drawings. The features mentioned in the claims and in the description may be essential to the invention individually per se or in arbitrary combination. There are shown schematically:

FIG. 1a a perspective view of a cutting board utilizable on two sides according to a first example of the invention;

FIG. 1b a bottom view of a cutting board utilizable on two sides according to a first example of the invention;

FIG. 1c a side view of the cutting board of a cutting board utilizable on two sides according to a first example of the invention;

FIG. 2 a perspective view of the cutting board utilizable on two sides from FIG. 1a, wherein the cutting board has been reversed;

DETAILED DESCRIPTION OF VARIOUS EMBODIMENTS

Figure 3:
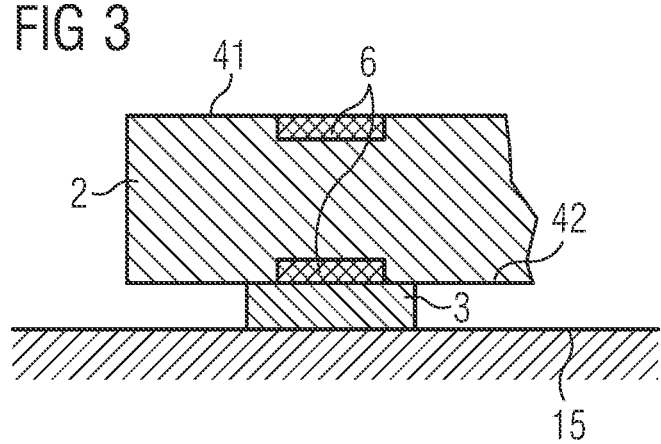
FIG. 3 a detail of a cutting board of FIG. 1a along the line A-A.

In the Figures, identical reference signs are largely employed for identical technical features even for different developments as well as embodiment examples of the invention.

In FIG. 1a and FIG. 2, a cutting board utilizable on two sides 1 is represented schematically in perspective view according to a first example of the invention. FIG. 1a shows a perspective view of a first main side 41 and FIG. 2 of a second main side 42 of the cutting board 1 opposing the first main side 41. FIG. 1b shows a bottom view and FIG. 1c a side view of the cutting board 1. The cutting board 1 accordingly has a board body 2 with the two mutually opposing main sides 41, 42 and four circumferential sides 43 as well as feet 3 for supporting the board body 2. Here, a first cutting surface 41a is located on the first main side 41 with a juice rim 21 and a second cutting surface 42a on the second main side 42. The feet 3 are removable and can be exchanged between both main sides 41 and 42. In FIGS. 1b and 1c there is shown how four feet 3 are arranged at the corners of the board body 2 on the second main side 42 of the board body 2 for supporting the same, and the first cutting surface 11a according to FIG. 1a points upward, while FIG. 2 shows a state of the cutting board 1 in which the cutting board 1 has been reversed and thus the second cutting surface 42a shows upward, i.e. the feet 3 are detached from the board body 2 and have been relocated from the second main side 42 to the first main side 41 of the board body 2 and have been attached there. The feet 3 are hence not visible in FIGS. 1a and 2.

FIG. 3 represents a detail of a cutting board of FIG. 1a along the line A-A. Here, the foot 3 consists of magnetic material, and there are attached a metal piece 6 on top of the first main side 41 and a metal piece 6 at the bottom of the second main side 42 within the board body 2. With it, the foot 3 and the metal piece 6 mutually attract. The foot 3 is supported by a bearing face 15.

Figure 4A:
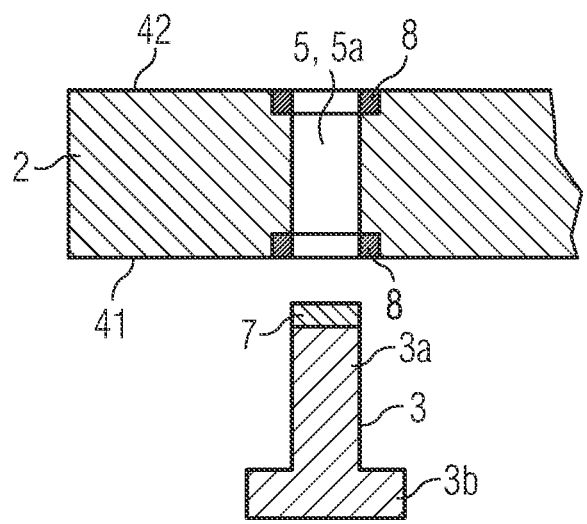
FIG. 4a a detail of a cutting board in a region where the foot is to be inserted into the cutting board, according to a second example of the invention.
Figure 4B:
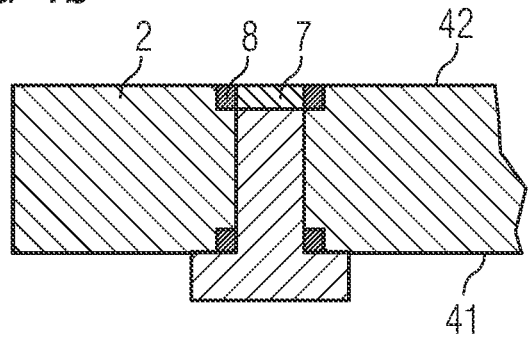
FIG. 4b the inserted state of the foot in a through hole of the board body.

FIG. 4a shows a detail of a cutting board 1 in a region where the foot 3 is to be inserted into the cutting board according to a second example of the invention, and FIG. 4b shows the inserted or mounted state of the foot 3 in a through hole 5a of the board body 2. The foot 3 has a rod portion 3a for inserting into a recess 5 which is here configured as a through hole 5a, and a broadened head portion 3b for supporting the board body 2. Here, the through hole 5a extends from the first main side 41 to the second main side 42 of the board body 2. In FIG. 4b, the foot 3 is inserted in the through hole 5a of the first main side 41 of the board body 2 and terminates with a free end of the rod portion 3a flush with the second main side 42 of the board body 2. The rod portion 3a of the foot 3 is equipped at its free end with a magnet 7 and the through hole 5a at both its ends respectively with a metal piece 8 or a metal ring so that the magnet 7 and the metal ring 8 mutually attract in the state according to FIG. 4 in which the rod portion 3a of the foot 3 is inserted in the through hole 5a. Alternatively, the magnet 7 can be configured as a metal piece and the metal piece 8 as a magnet.

Figure 5:
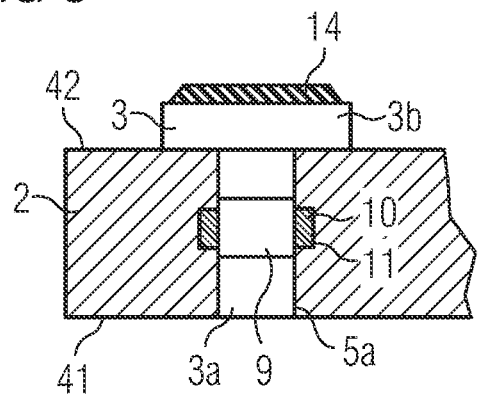
FIG. 5 a detail of a cutting board in a region where the foot is inserted in the cutting board, according to a third example of the invention.

FIG. 5 shows a detail of a cutting board 1 in a region where the foot 3 is inserted in or mounted to the cutting board according to a third example of the invention. The third example differs from the second example according to FIGS. 4a and 4b in that no magnet is provided at the free end of the foot and no metal ring at both ends of the through hole, but that the rod portion 3a of the foot 3 has a metal piece 9 at about the middle and the through hole 5a is equipped with a magnet or magnetic ring 10. The magnetic ring 10 is arranged in a ring groove 11 on the inside circumference wall of the through hole 5a in a countersunk manner so that the metal piece 9 and the magnetic ring 10 mutually attract in the state according to FIG. 5 in which the rod portion 3a of the foot 3 is inserted in the through hole 5a. Moreover, the head portion 3b on the side facing away from the rod portion 3a is equipped with a rubber layer 14. Alternatively, the metal piece 9 can be configured as a magnet and the magnetic ring 10 as a metal piece.

Figure 6:
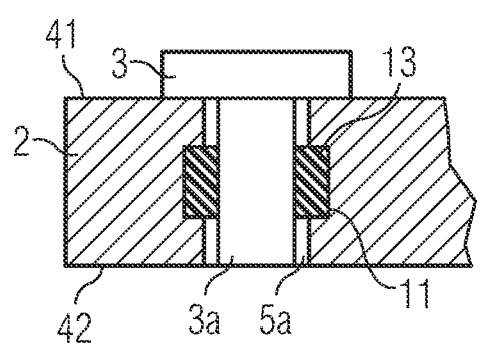
FIG. 6 a detail of a cutting board in a region where the foot is inserted in the cutting board, according to a fourth example of the invention.

FIG. 6 shows a detail of a cutting board 1 in a region where the foot 3 is inserted in or mounted to the cutting board according to a fourth example of the invention. The fourth example differs from the second example according to FIGS. 4a and 4b in that no magnet is provided at the free end of the foot and no metal ring at both ends of the through hole, but the through hole 5a is equipped with a plastic ring 13, preferably an elastomer or rubber ring. The plastic ring 13 is arranged projectingly in a ring groove 11 on the inside circumference wall of the through hole 5a so that the rod portion 3a of the foot 3 is locked into place or anchored by means of frictional force in the plastic ring 13 in the state according to FIG. 6 in which the rod portion 3a of the foot 3 is inserted in the through hole 5a. Here, the rubber ring 13 is pressed completely into the ring groove 11 so that the rod portion 3a fills the through hole 5a substantially completely. Alternatively, the rubber ring 13 can be also arranged in a ring groove of the rod portion 3a.

Figure 7:
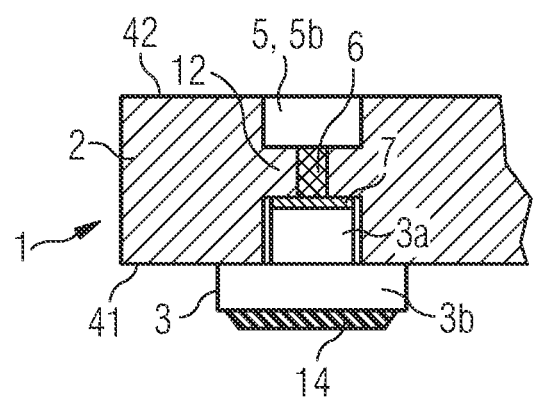
FIG. 7 a detail of a cutting board in a region where the foot is inserted in the cutting board, according to a fifth example of the invention.

FIG. 7 shows a detail of a cutting board 1 in a region where the foot 3 is inserted in or mounted to the cutting board according to a fifth example of the invention. The fifth example differs from the second example according to FIGS. 4a and 4b in that the recess 5 is configured not as a through hole, but as a blind hole 5b. Accordingly, the board body 2 of the cutting board 1 has pairwise opposing blind holes 5b on both sides. The rod portion 3a of the foot 3 is equipped with a magnet 7 at its free end and a metal piece 6 is arranged on an intermediate wall 12 between opposing blind holes 5b so that the metal piece 6 and the magnet 7 mutually attract in the state according to FIG. 7 in which the rod portion 3a of the foot 3 is inserted in the blind hole 5b. Moreover, the head portion 3b on the side facing away from the rod portion 3a is equipped with a rubber layer 14. Alternatively, the magnet 7 can be configured as a metal piece and the metal piece 6 as a magnet.

Figure 8:
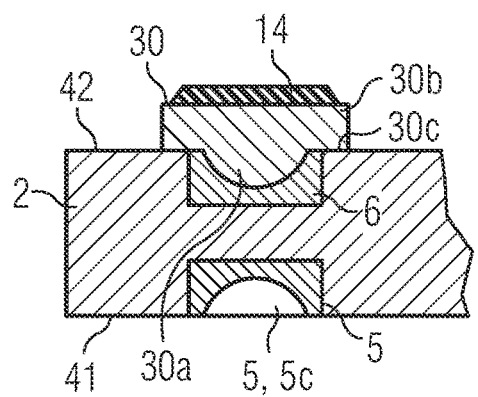
FIG. 8 a detail of a cutting board in a region where the foot is inserted in the cutting board, according to a sixth example of the invention.

FIG. 8 shows a detail of a cutting board 1 in a region where the foot 3 is inserted in or mounted to the cutting board according to a sixth example of the invention. On the main sides 41, 42, the board body 2 has respectively a recess 5 in which respectively a metal piece 6 is attached for interacting with the foot 30 of magnetic material. Here, the metal piece 6 has a spherical recess 5c and the foot 30 a spherical projection 30a and a head portion 30b for supporting the board body 2, wherein the spherical projection 30a, which projects from one side of the head portion 30b of the foot 30, is smaller in circumference than the head portion 30b so that an annular contact face 30c results on the one side of the head portion 30b. The contact face 30c lies against the metal piece 6 and the board body 2 in the state according to FIG. 8 in which the spherical projection 30a is inserted in the spherical recess 5c of the metal piece 6. Moreover, the head portion 30b on the side facing away from the projection 30a is equipped with a rubber layer 14. In an alternative not shown, the contact face can even lie only against the metal piece. Alternatively, the metal pieces 6 received in the recess 5 can be magnetic and the foot 30 simply metallic.

Figure 9:
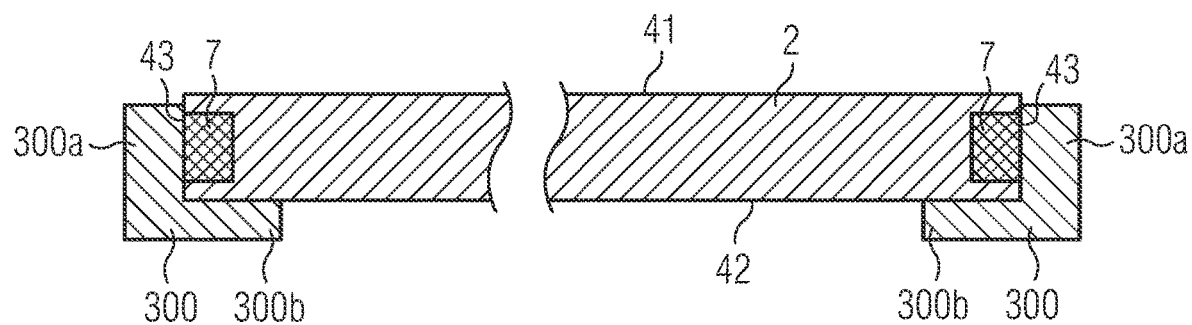
FIG. 9 a cross section of a cutting board according to a seventh example of the invention.

FIG. 9 shows a cross section of a cutting board according to a seventh example of the invention. The cutting board 1 comprises four feet 300 arranged on opposing circumferential sides 43 of the board body 2, of which only two feet 300 are shown. Here, the foot 300 consists of metal and is configured L-shaped, with two legs 300a, 300b of which the leg 300a lies against the circumferential side 43 of the board body 2 and the legs 300b against the main side 42 of the board body 2 so that the main side 42 of the board body 2 is supported. Moreover, respectively at least two magnets 7 are attached within the board body 2 on opposing circumferential sides 43 of the board body 2. The foot 300 and the magnet 7 mutually attract, whereby the foot 300 is positioned on the board body 2 and attached thereupon. The feet 300 can simply be reversed so that the legs 300b are borne on the opposing main side 41. Alternatively, the magnet 7 can be metallic and the foot 300 simply magnetic. Further alternatively, the foot 300 can be U-shaped (not shown), wherein the foot 300 with its second free leg sits in a recess (not shown) of the circumferential side 43.

The preceding explanation of the embodiments describes the present invention exclusively within the scope of examples. Individual features of the embodiments can, of course, be freely combined, with each other, if technically expedient, without leaving the frame of the present invention.

The invention claimed is:

1. A cutting board employable on two sides comprising a board body with two mutually opposing main sides and feet for supporting the board body,
    wherein a first cutting surface is located on a first main side of the board body and a second cutting surface on a second main side of the board body,
    wherein the feet are variably adjustable such that they support the board body alternatively in a first position of the feet with the first cutting surface facing upward and in a second position of the feet with the second cutting surface facing upward, and with no feet protruding upward beyond the upward facing first or second cutting surface.

2. The cutting board according to claim 1, wherein the feet are detachable from the board body and are relocatable from the first or second main side to the opposed first or second main side of the board body.

3. The cutting board according to claim 1, wherein the cutting board has at least three feet which are arranged preferably on an edge side, more preferably at corners of the board body.

4. The cutting board according to claim 1, wherein at least one of the feet is equipped with a rubber layer.

5. The cutting board according to claim 1, wherein the feet are attachable to the board body magnetically, by locking into place, or by screwing.

6. The cutting board according to claim 1, wherein the feet are manufactured at least partly of magnetic material and interact with a metal piece attached within the board body, or vice versa.

7. The cutting board according to claim 1, wherein the board body has recesses which are respectively configured as a through hole or blind hole into which respectively one of the feet is insertable.

8. The cutting board according to claim 7, wherein the feet have a rod portion for inserting into the through hole or blind hole and a broadened head portion for supporting on a bearing face.

9. The cutting board according to claim 7, wherein the feet are insertable into the through hole from the first or second main side of the board body and terminate with a free end of a rod portion of the feet flush with the opposed first or second main side of the board body.

10. The cutting board according to claim 9, wherein the rod portion of the feet is equipped at the free end with a magnet and the through hole at both ends of the through hole respectively with a metal piece, or vice versa, so that the magnet and the metal piece mutually attract when the rod portion of the feet is inserted in the through hole.

11. The cutting board according to claim 9, wherein the rod portion of the feet is equipped with a metal piece and the through hole with a magnet, which is arranged on an inside circumference wall of the through hole in a countersunk manner, or vice versa, so that the metal piece and the magnet mutually attract when the rod portion of the feet is inserted in the through hole.

12. The cutting board according to claim 9, wherein the through hole is equipped with a plastic ring, preferably of rubber, which is arranged projectingly on an inside circumference wall of the through hole so that the rod portion of the feet is lockable into place at the plastic ring or anchorable to the same by means of frictional force when the rod portion of the feet is inserted in the through hole.

13. The cutting board according to claim 7, wherein the board body of the cutting board has pairwise opposing blind holes on both sides, and
wherein a rod portion of the feet is equipped with a magnet at a free end and a metal piece is arranged on an intermediate wall between opposing blind holes, or vice versa, so that the metal piece and the magnet mutually attract when the rod portion of the feet is inserted in the blind hole.

14. The cutting board according to claim 1, wherein the board body on both main sides has recesses, in which there is fastened respectively a metal piece for interacting with one of the feet, which is magnetic,
wherein the metal piece has a spherical recess and the foot a spherical projection for inserting into the spherical recess of the metal piece and a head portion for supporting a bearing face.

15. The cutting board according to claim 1, wherein on opposing circumferential sides of the board body respectively at least one magnet is attached within the board body which can interact respectively with one of the feet, and wherein the foot is metallic and configured U- or L-shaped with at least two legs of which one leg is set up for placing on one of the opposing circumferential sides of the board body and the other leg for placing on one of the first and second main sides of the board body, to support this main side of the board body.

16. The cutting board according to claim 3, wherein the feet are arranged on an edge side the board body.

17. The cutting board according to claim 3, wherein the feet are arranged at corners of the board body.

18. The cutting board according to claim 7, wherein the recesses are arranged on an edge side of the board body.

19. The cutting board according to claim 7, wherein the recesses are arranged at corners of the first and second main sides of the board body.

20. The cutting board according to claim 14, wherein the spherical projection is smaller in circumference than the head portion so that on side of the head portion defining the spherical projection an annular contact face results for placing against at least one of the metal piece and the board body of the cutting board.

* * * * *